United States Patent [19]
Becker et al.

[11] Patent Number: 5,638,732
[45] Date of Patent: Jun. 17, 1997

[54] APPARATUS FOR CUTTING OF ELASTOMERIC MATERIALS

[75] Inventors: Michael Lee Becker, Akron; Klaus Beer, Stow; Daniel Ray Downing, Uniontown; William Frank Dunn, Stow; James Michael Hart, Akron; Dennis Alan Lundell, Uniontown, all of Ohio

[73] Assignee: The Goodyear Tire & Rubber Company, Akron, Ohio

[21] Appl. No.: 299,943

[22] Filed: Sep. 2, 1994

[51] Int. Cl.$^6$ .................... B26D 1/547; B26D 7/02
[52] U.S. Cl. ............... 83/461; 83/460; 83/647; 83/651.1; 83/698.71; 83/758; 83/786; 83/465
[58] Field of Search .................... 83/171, 460, 461, 83/465, 647, 651.1, 698.71, 699.21, 758, 783, 784, 581.1, 786; 125/16.01; 269/22

[56] References Cited

U.S. PATENT DOCUMENTS

| | | | |
|---|---|---|---|
| 2,692,622 | 10/1954 | Heese | 83/786 X |
| 2,735,457 | 2/1956 | Raspanti | 84/784 |
| 3,048,386 | 8/1962 | Thumim | 83/460 |
| 3,108,350 | 10/1963 | Bergling | 83/651.1 X |
| 3,138,049 | 6/1964 | Flory et al. | 83/461 |
| 3,789,712 | 2/1974 | Enders | 83/171 |
| 4,187,751 | 2/1980 | Barnack | 83/465 X |
| 4,334,448 | 6/1982 | Messerschmitt | 83/171 |
| 4,610,653 | 9/1986 | Savich | 83/651.1 X |
| 4,702,138 | 10/1987 | Hattori et al. | 83/651.1 X |
| 4,724,735 | 2/1988 | Rice | 83/784 X |
| 5,058,476 | 10/1991 | Legler et al. | 83/786 X |
| 5,178,052 | 1/1993 | Hansen | 83/651.1 X |
| 5,299,483 | 4/1994 | Ber-Fong | 83/758 X |

*Primary Examiner*—Eugenia Jones
*Attorney, Agent, or Firm*—David L. King

[57] ABSTRACT

An apparatus for cutting an elongated body of elastomeric material includes a tensioned wire which is oscillated in a generally up and down motion while traversing through the elastomeric material. The wire acts as a cutting blade and prepares the cut surface of the elastomeric material to improve splices. The wire is suspended between a pair of pivotally mounted arms so that the wire oscillates as the arms are rocked by an eccentric mounted to a rotating shaft. The cutter wire passes through the body of elastomeric material at an angle relative to the plane in which the body of elastomeric material lies. The body of elastomeric material is secured in place by clamp segments which conform themselves to the cross-sectional shape of the body. The cutter wire is traversed through the elastomeric material on a cutter frame which is moved by a ball screw driven by a variable speed electric motor.

5 Claims, 7 Drawing Sheets

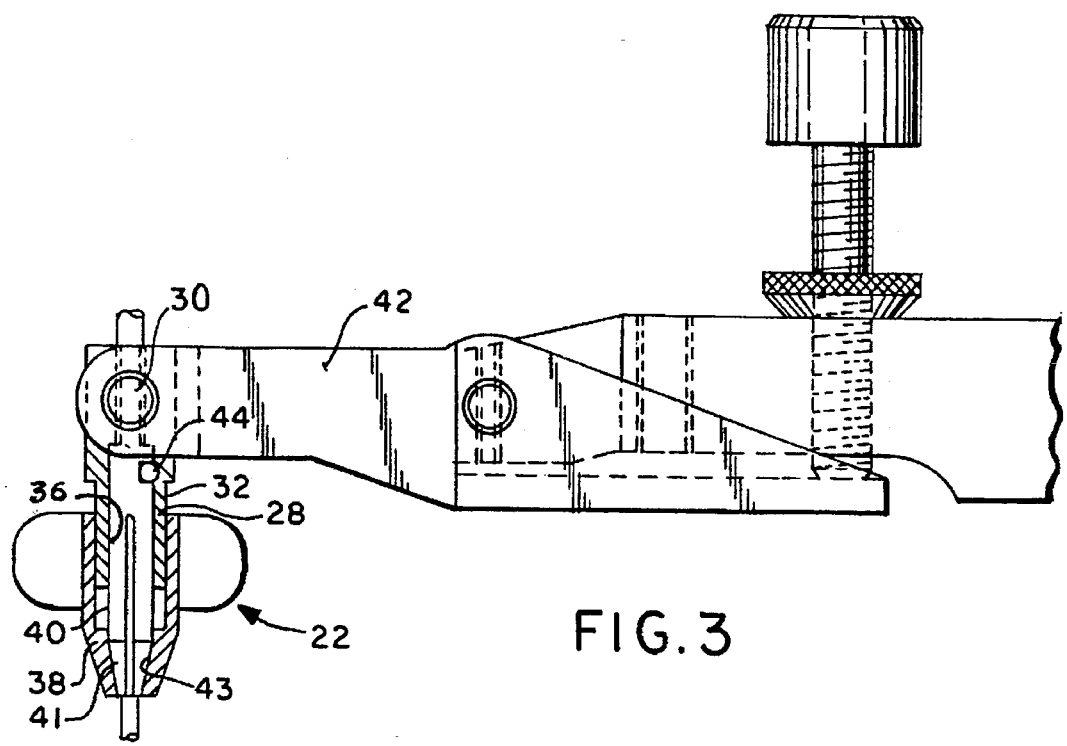
FIG. 3
FIG. 3A
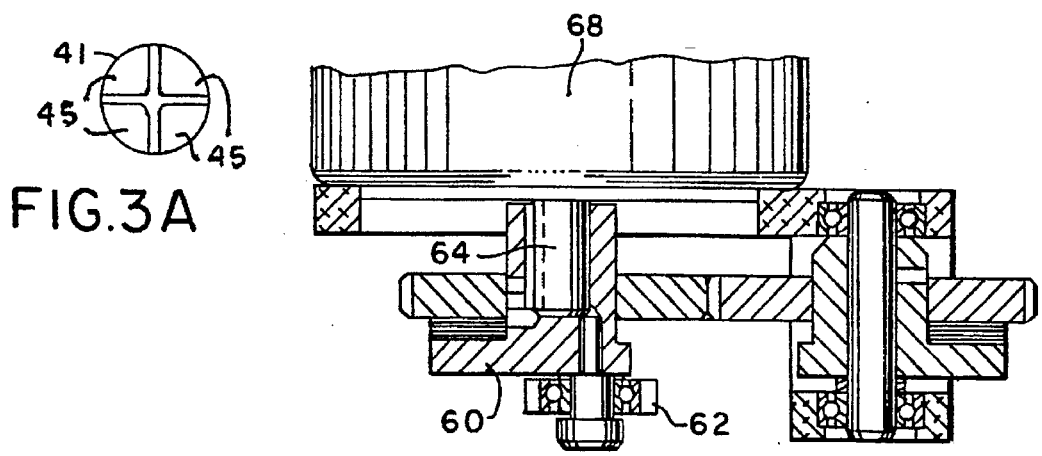
FIG. 4
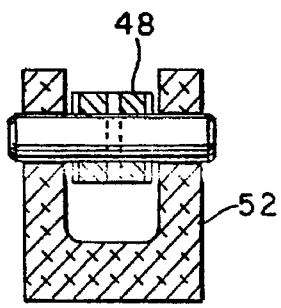
FIG. 5

APPARATUS FOR CUTTING OF ELASTOMERIC MATERIALS

BACKGROUND OF THE INVENTION

1. Field of Invention

This invention pertains to the art of methods and apparatus for cutting elastomeric materials, and more specifically to methods and apparatus for cutting elastomeric materials of different cross-sectional shapes including reinforced bodies and bodies which have cut ends which later will be spliced together.

2. Description of the Related Art

Methods and apparatus for cutting elastomeric materials are known in the art. These prior art cutting methods and apparatus included cutting wheels, ultrasound, scissor type cutters and guillotine knives. While the guillotine knife was somewhat effective, it had disadvantages as well. One disadvantage was its tendency to deform the cut surfaces of the elastomeric material as the knife penetrated the elastomeric material. This made splicing the ends of the elastomeric material more difficult. A second disadvantage of the guillotine knife was that the quality of the cutting surfaces deteriorated in use as the blade became dull or as small pieces of elastomer began to build up on the blade. A third disadvantage was the inability of the blade to cut a tire tread at an angle less than 30 degrees. Finally, the guillotine blade tended to generate heat by cutting and, as numerous cuts were made, the temperature of the knife became elevated and in some cases precured the unvulcanized elastomer at the cut location. This further reduced the capability of the cut edge to be spliced properly.

The cutter of the present invention can cut a tread at angles less than 30 degrees without deformation or precuring. This can be done precisely and quickly. The cutter also provides improvements to the splice surface and splice quality of cut elastomeric materials due to the improvements in the cutting process and apparatus.

SUMMARY OF THE INVENTION

In accordance with the present invention, a new and improved method and apparatus for cutting elastomeric materials is provided.

More particularly, there is provided an apparatus for cutting elastomeric materials with a wire having first and second ends, a first and second securing means for securing the wire in tension there between. A pair of arms support the first and second securing means. The arms are pivotally mounted for oscillations when driven by an eccentric mounted on a motor driven rotating shaft. A traversing means creates relative motion between the wire and the elastomeric material so that the wire cuts through the elastomeric material while oscillating.

There is also provided a method of cutting an elastomeric material by tensioning a wire between first and second securing means, oscillating the wire and traversing the wire through the elastomer, thereby cutting the elastomer.

In accordance with one aspect of the invention there is provided a method of cutting a body of elastomeric material to length at a predetermined cutting position and predetermined angle comprising supporting the body at a position spaced from the predetermined cutting position, urging an oscillating cutter wire into engagement with the body at the predetermined cutting position for cutting a slit in the body, moving the cutter wire through the body at a predetermined speed for deepening the slit and continuing the movement of the cutter wire through the body until the slit extends through the body.

In accordance with another aspect of the invention there is provided an apparatus for cutting an elongated body of elastomeric material to length at a predetermined cutting position and angle along a conveyor supporting the elongated body and having an opening in the conveyor at the predetermined cutting position comprising a cutter assembly for moving through the opening including a wire cutting member supported at each end on spaced-apart arms pivotally mounted on the cutter assembly, each of the arms having a pivotal mounting for rocking movement of the arms and power means connected to the arms for rocking of each the arm about the pivotal mounting causing the cutting member to oscillate and create a slit in the elongated body of elastomeric material and means to provide relative movement of the cutter assembly across the elongated body to extend the slit through the elongated body at the predetermined position.

In accordance with a further aspect of the invention there is provided a splice between a first cut end of a first section of an elongated body of elastomeric material and a second cut end of a second section of the elongated body of elastomeric material, the first cut end having a first splice surface, the second cut end having a second splice surface in engagement with the first splice surface, and the first splice surface and the second splice surface having textured smeared surfaces prepared before splicing by cutting the elongated body at spaced apart positions along the body with an oscillating wire traversing the elongated body.

In accordance with a still further aspect of the invention there is provided a splice surface for a body of elastomeric material comprising a textured smeared surface formed by cutting the body with an oscillating wire traversing the body.

One advantage of the present invention is the provision of a method and apparatus for cutting elastomeric materials.

Another advantage of the invention is a method and apparatus for cutting elastomeric materials which improves the quality of the cut edge and leads to better splicing of components made from the elastomeric materials.

A further advantage of the invention is the provision of a cutting blade, in this case wire, which stays sharp through many cuts.

A still further advantage of the invention is the provision of an improved uniform edge quality of the cut surface of the elastomeric materials.

Another advantage of the invention is the improvement of splice quality when the inventive method and apparatus is used.

A further advantage of the invention is the cutting by the wire at lower temperatures than with prior art cutting blades, thereby reducing the tendency for the cut edge to be precured by the cutting process.

A still further advantage of the invention is the provision of an improved securing means which includes a pair of pivoted collets that greatly reduce the possibility of the wire breaking during the cutting operation.

Other benefits and advantages of the invention will become apparent to those skilled in the art to which it pertains upon a reading and understanding of the following detailed specification.

IN THE DRAWINGS

The invention may take physical form in certain parts and arrangement of parts, a preferred embodiment of which will be described in detail in this specification and illustrated in the accompanying drawings which form a part hereof and wherein:

FIG. 3 is an enlarged fragmentary view, partially in cross-section, of the securing means or collet shown in FIGS. 1 and 2.

FIG. 3A is an enlarged end view of the collet shown in FIG. 3.

FIG. 4 is a cross-sectional view taken along line 4—4 of FIG. 1.

FIG. 5 is a cross-sectional view taken along line 5—5 of FIG. 1.

DESCRIPTION OF THE PREFERRED EMBODIMENT

Figure 1:
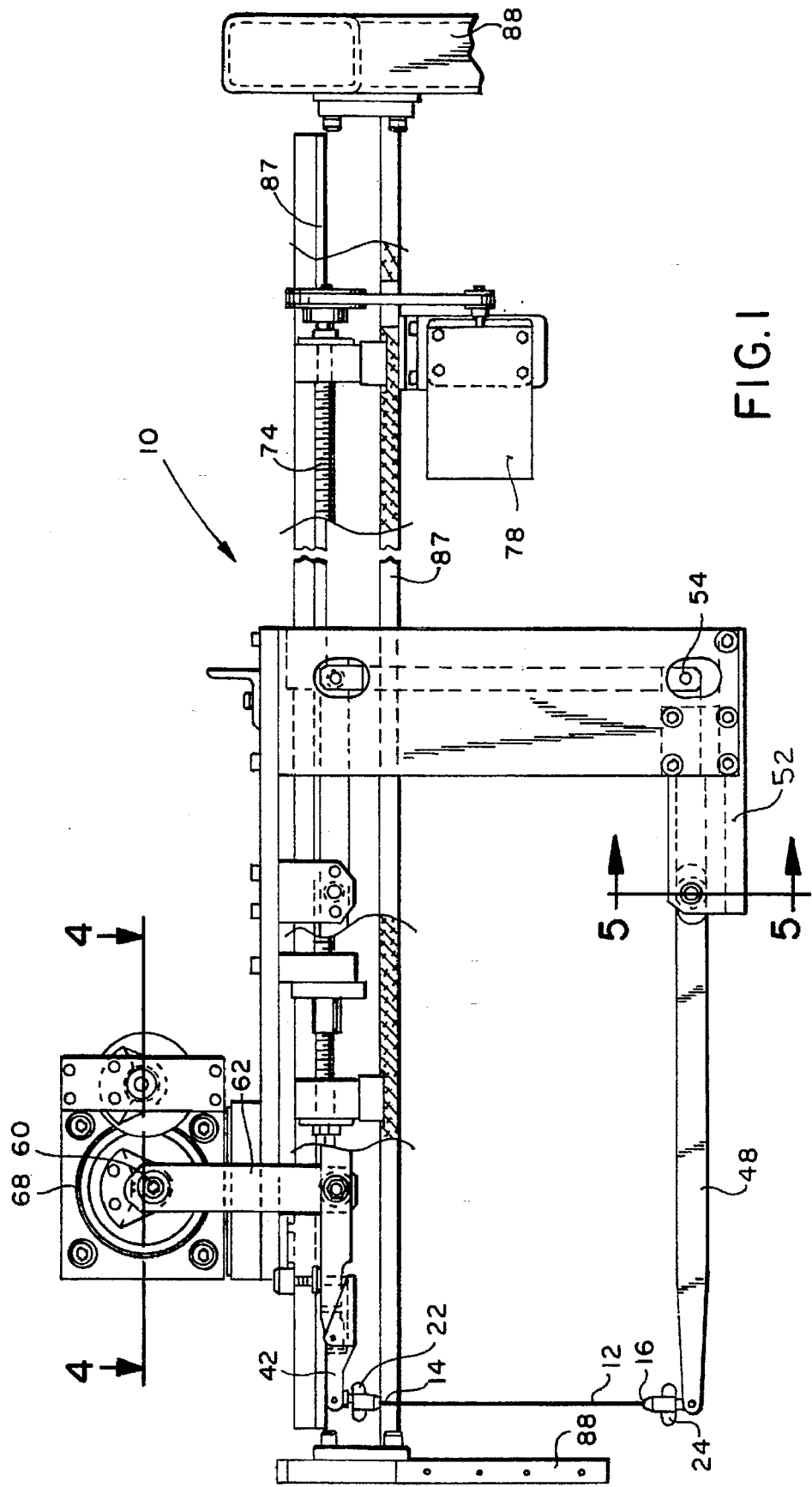
FIG. 1 is a front view of an apparatus according to the invention taken along a plane parallel to the cutting plane of the cutter with parts being broken away.

Referring now to the drawings wherein the showings are for purposes of illustrating preferred embodiments of the invention only and not for purposes of limiting the same, FIG. 1 shows a front view of a cutting apparatus according to the invention. The apparatus includes a cutting assembly 10 which includes a cutting wire 12. The cutting wire 12 is preferably made of high tensile steel and has a first end 14 and a second end 16. The wire 12 is preferably round in cross-section and has a diameter between 0.010 inches (0.0254 cm) and 0.050 inches (0.129 cm). The preferred wire 12 of this embodiment has a diameter of 0.050 inches.

The first and second ends 14,16 of the wire 12 are secured within securing means. The preferred securing means of this embodiment are collets 22,24. With reference to FIG. 3, an enlarged view of collet 22 is illustrated. The following description of collet 22 also applies to collet 24. The collet 22 includes a first inner cylindrical housing 28 having an outer threaded surface 32. The collet 22 also includes a second outer cylindrical housing or thumbnut 38 having an inner threaded surface 40 for engaging the threads on the outer surface 32 of the first housing 28. Received within the first housing 28 is a collet body 41. Collet body 41 includes an axial opening for the reception of first end 14 of the wire 12, as shown in FIG. 3A. Thumbnut 38 is rotatable about the first housing 28 to secure the first end 14 of the wire 12 within the collet body 41.

Figure 2:
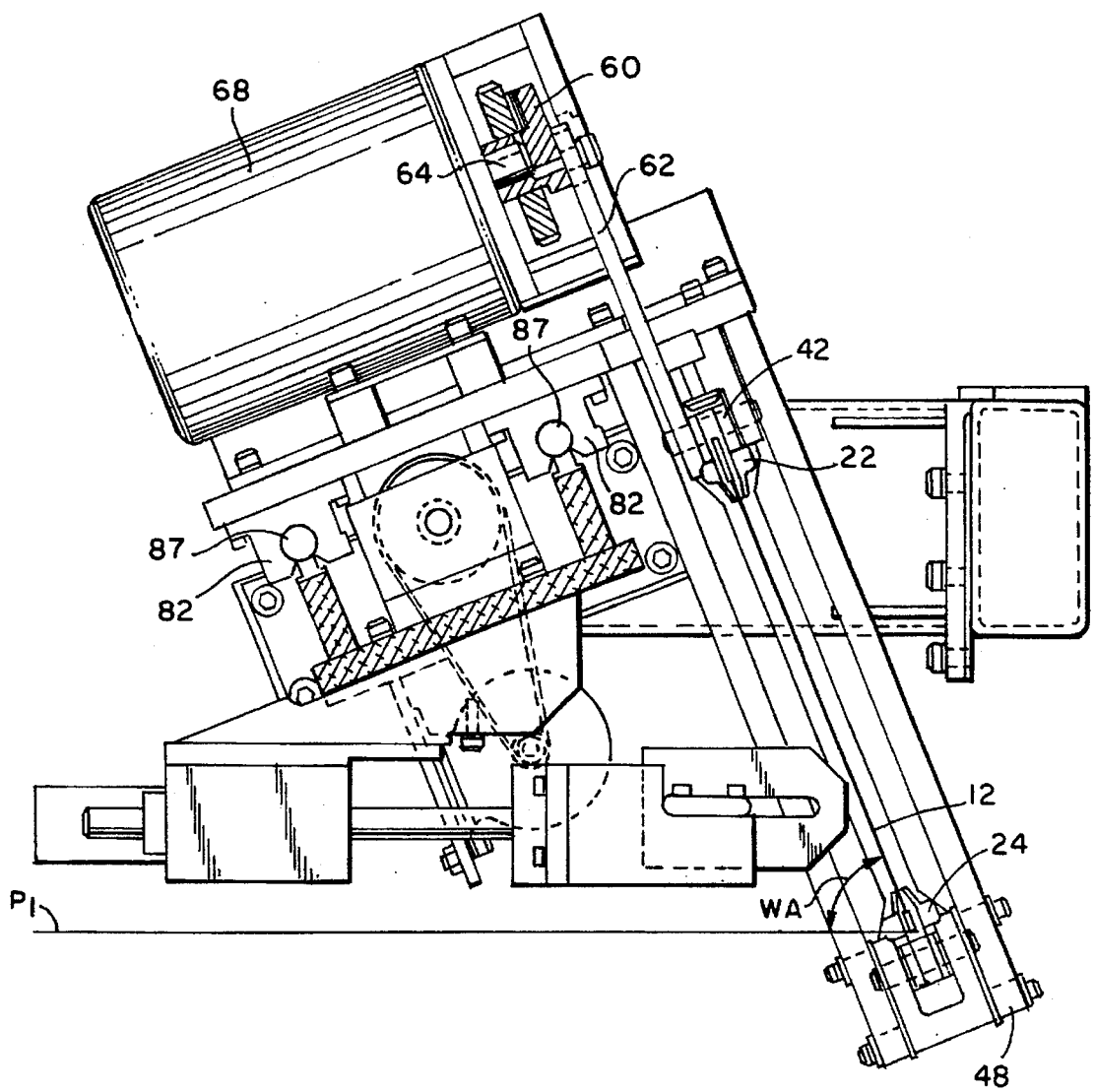
FIG. 2 is an enlarged end view of the apparatus shown in FIG. 1.

As shown in FIGS. 2 and 3, collet 22 is mounted on a first arm 42 by a pivot pin 30. Pivot pin 30 includes an opening in the lengthwise center through which the wire 12 passes. The wire 12 is uniformly loaded because it always passes through the center of a pivot pin 30 in a first arm 42 thereby eliminating or greatly reducing the possibly of the wire kinking or bending during operation. In addition, the pivot pin 30 eliminates bending stresses in the wire 12 during the cutting cycle. The wire 12 may deform into a bow-shape during the cutting of the elastomeric material. Such a bow-shape would normally generate bending stresses at the clamping point but, due to the pivot pin 30, these bending stresses are relieved and the wire life is improved. The wire 12 can be threaded through either end of the collets 22,24, facilitating wire changes.

Once the wire 12 is threaded through the collet 22, thumbnut 38 is rotated to secure the wire 12 therein. With continuing reference to FIG. 3, the collet 22 further includes a spring pin 44 which engages the collet body 41 and first housing 28. Because the tightening of the thumbnut 38 is axial to the axis of the wire, the wire 12 is not bent or kinked during the process. In addition, the inside end 36 of the collet body 41 features a low angle inclined surface 43 for generating large clamping force with the hand tightened thumbnut 38.

The spring pin 44 prevents the collet body 41 from turning when the thumbnut 38 is tightened. This prevents the wire 12 from twisting and being stressed. The spring pin 44 also performs the function of retaining the collet body 41 within the first housing 28 when the thumbnut 38 is loosened.

With reference to FIG. 3A, the collet body 41 is shown in an end view. It can be seen that the clamping elements 45 of the collet body 41 provide contact around nearly the entire periphery of the wire 12. This near 360° contact is a great improvement over the standard two point contact found in two piece clamps.

With reference to FIGS. 1 and 2, the second collet 24 is pivotally mounted on a second arm 48 which is in turn pivotally mounted on a frame 52. The first arm 42 is also pivotally mounted on the frame 52 and connected to the second arm 48 by a center link 54.

With reference to FIG. 2, the wire 12 is shown in an inclined position, i.e., the wire 12 makes an angle WA with respect to a plane P1 which contains the elastomeric material or is parallel to a plane containing the elastomeric material. The angle WA can vary between 10 degrees and 80 degrees although the preferred angle is essentially 22.5 degrees. This is an improvement over prior art cutting mechanisms which were much more limited in the angles of their cuts. For example, the cutting apparatus 10 disclosed herein is especially applicable for cutting unvulcanized tire treads. The range of angles possible with the inventive cutting apparatus widens the possibilities for the tire designer.

With continuing reference to FIGS. 1,2 and 4, the arms 42 and 48 are oscillated for oscillating the wire 12 at a certain oscillation rate. In the preferred embodiment, an eccentric 60 is affixed to an output shaft 64 of a variable speed motor 68. The eccentric 60 is pivotally connected to the first arm 42 by a crank arm 62. The variable speed motor 68 can be adjusted, and the shaft 64 rotated thereby, so that the oscillating rate can vary up to about 2,000 cycles per minute. In the preferred embodiment, the oscillating rate is adjustable based on parameters such as the thickness and type of elastomeric member being cut and the transverse speed of the wire 12. One preferred combination is a oscillating rate of 1600 cycles per minute and a transfer speed of 2.25 inches (5.72 cm) per second when cutting passenger tire treads.

With continuing reference to FIGS. 1 and 2, the cutting assembly 10 further comprises a traversing means for creating relative motion between the wire 12 and the elastomeric material to be cut by the cutting assembly 10. In the preferred embodiment, the traversing means comprises a ball screw 74 driven by a variable speed motor 78. The frame 52 is mounted on linear bearings 82 slidably supported on rods 87 mounted on stationary support 88 to provide low friction movement of the frame relative to the stationary support.

Figure 6:
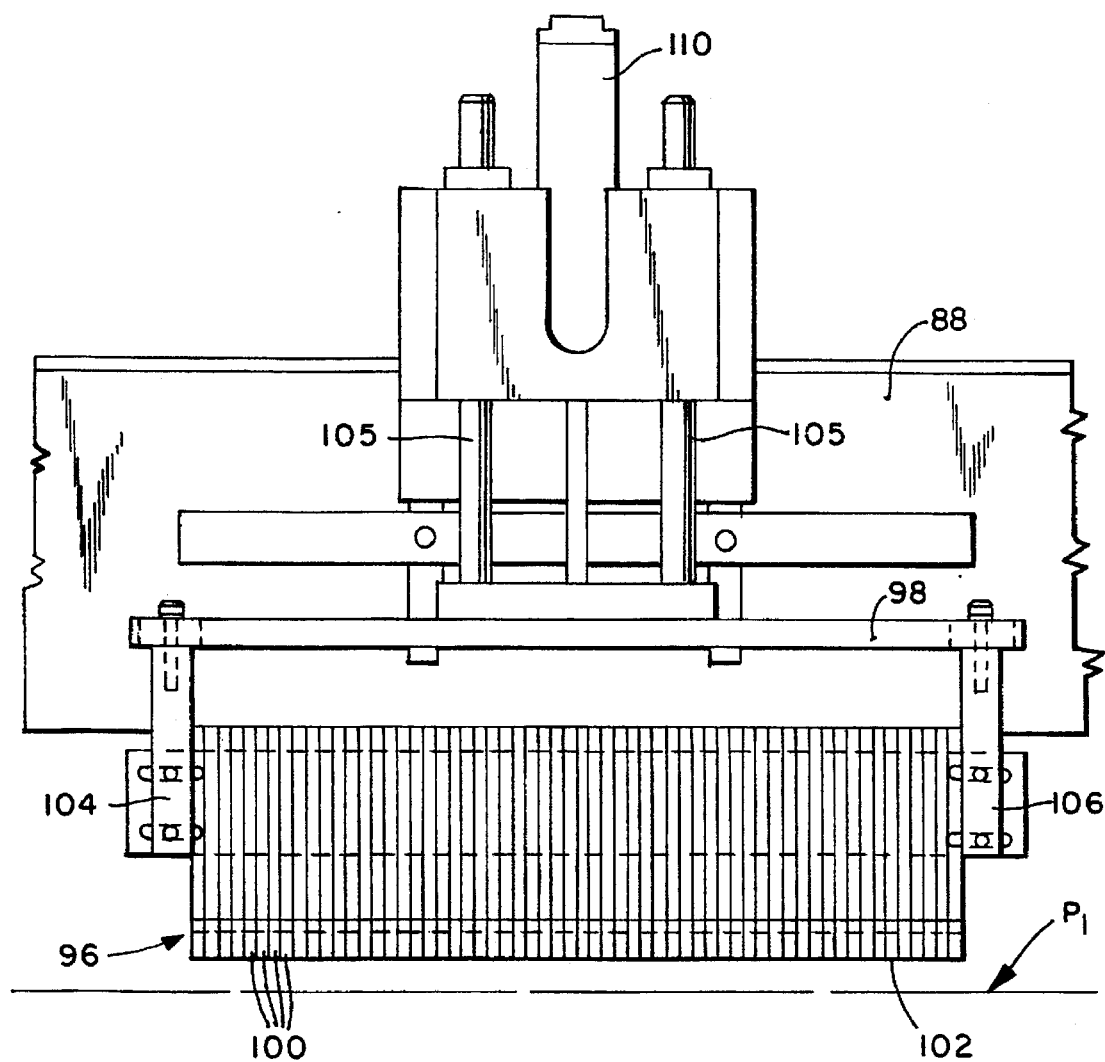
FIG. 6 is a front view of a laminated clamp apparatus for clamping the elastomeric material.

With reference to FIG. 6, the cutting assembly 10 further comprises a clamping assembly 96 for clamping the sheet of elastomeric material as it is being cut by the oscillating wire 12. The elastomeric material is located in the plane P, shown in FIGS. 2 and 6 and the clamping assembly 96 is mounted on the stationary support 88. A frame 98 supports a plurality of clamp segments 100 clamped in side by side relation between frame end members 104 and 106. The segments 100 are adjustable vertically so as to conform with the profile of the elastomeric material to be cut as for example a tire tread. The frame 98 is mounted on guide rods 105 and is moveable vertically into and out of engagement with the elastomeric material by a pneumatic piston cylinder assembly 110 in communication with a source of air pressure such as factory air.

Figure 10:
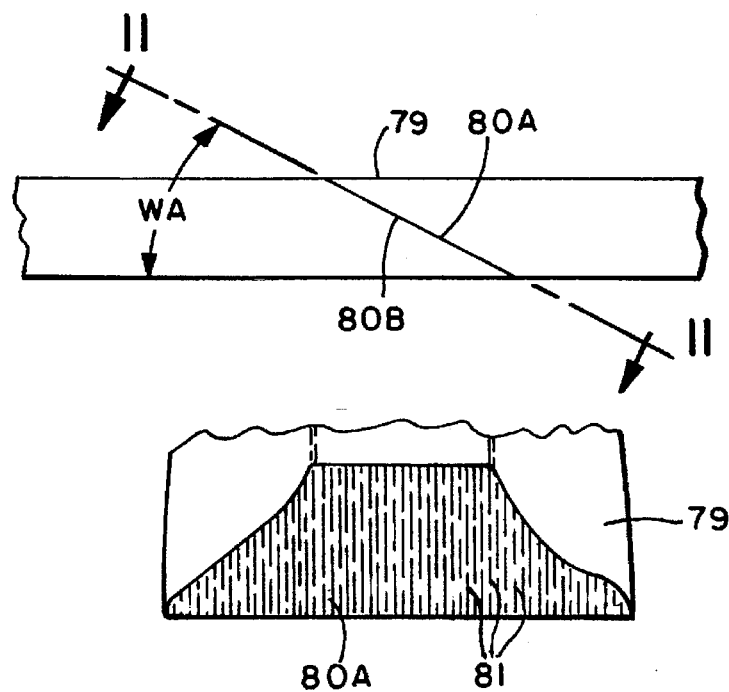
FIG. 10 is an enlarged side view of a tire tread showing the spliced section.
Figure 11:
FIG. 11 is a view of the cut splice surface taken along line 11—11 in FIG. 10.

In operation an elongated body of elastomeric material such as tire tread 79 shown in FIGS. 10 and 11 is placed on a support which may be a belt conveyor in the plane P, and clamped by the clamping assembly 96. The motor 68 is started causing the crank arm 62 to oscillate the first arm 42 which is connected to the second arm 48 by center link 54 causing the second arm to oscillate and provide for oscillation of the wire 12. The motor 78 is then actuated for moving the frame 52 to the left as shown in FIG. 1 from a position adjacent the motor 78 into engagement with the tread 79 of elastomeric material.

As the oscillating wire 12 engages the elastomeric material of the tread 79 it forms a slit in the material. Then as the wire 12 is advanced through the tread 79 the wire displaces the material ahead of the slit in small increments so that the wire can advance evenly. It is believed that the cutting is facilitated by the adherence of a contact layer of elastomeric material to the wire 12 which takes place until the limit of shear stress for the contact layer is reached. As shown in FIG. 11 a cut splice surface 80A may be striated by the process which provides a surface with parallel grooves 81 and ribs smeared by the reciprocating wire 12. This surface 80A has been found to be desirable for splicing cut ends of the tire tread 79. In fact, tire components of elastomeric material cut by the oscillating cutter wire 12 traversing the components have been found to provide a splice between the cut splice surface 80A and 80B, which does not require an adhesive for a good splice. With tread 79 and other tire components the cut section has cut ends which may be spliced to form an annulus on the tire building machine.

The cut splice surface 80A shown in FIG. 11 is formed by cutting across the tread 79 in a direction from left to right. The cutter wire 12 may displace the elastomeric material and slightly distort the surface. The surface 80B which is also cut from left to right has been found to be distorted the same amount. Accordingly the surfaces 80A and 80B match and provide mating engagement when spliced.

Figure 8:
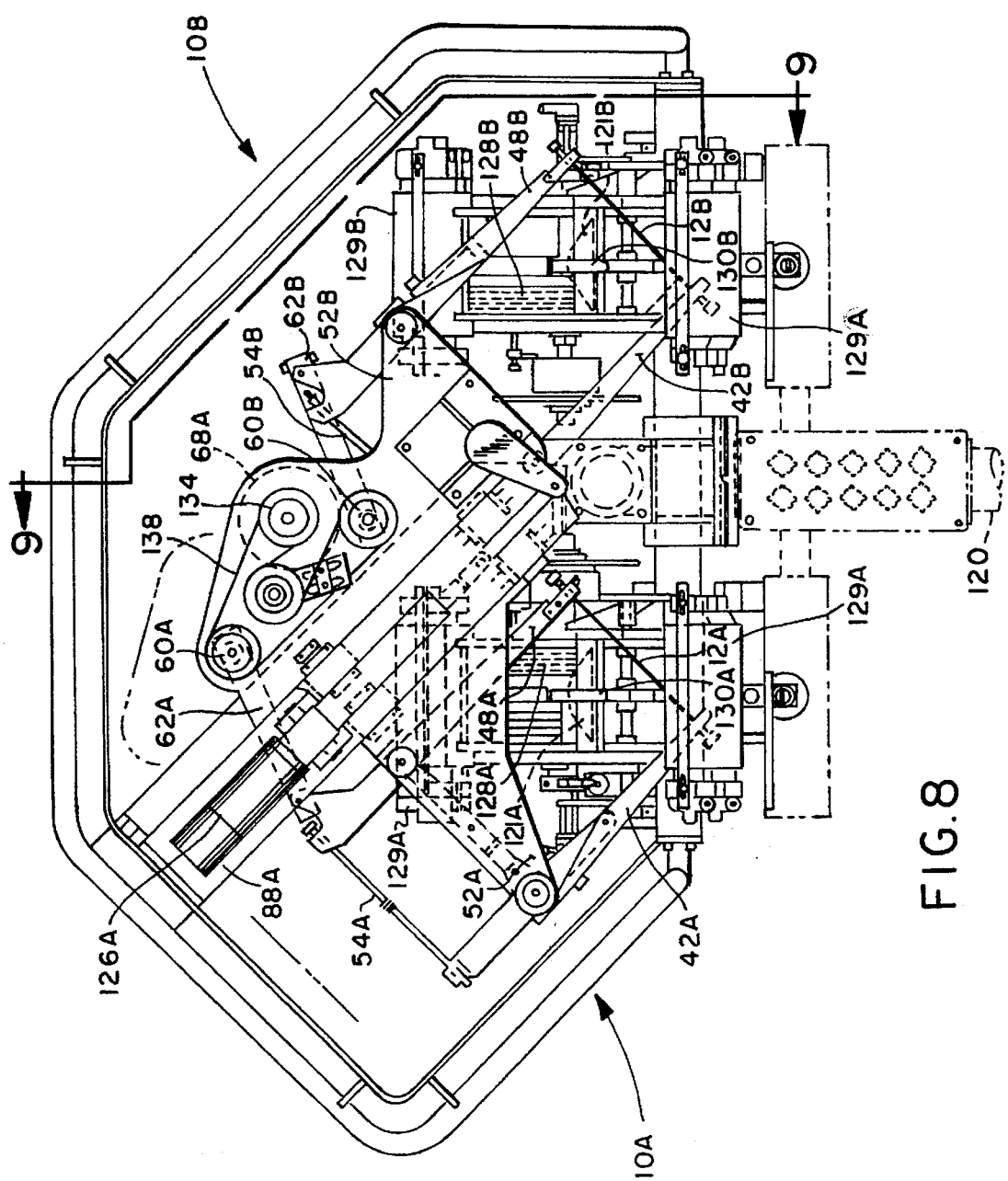
FIG. 8 is a plan view of another embodiment of the invention.
Figure 9:
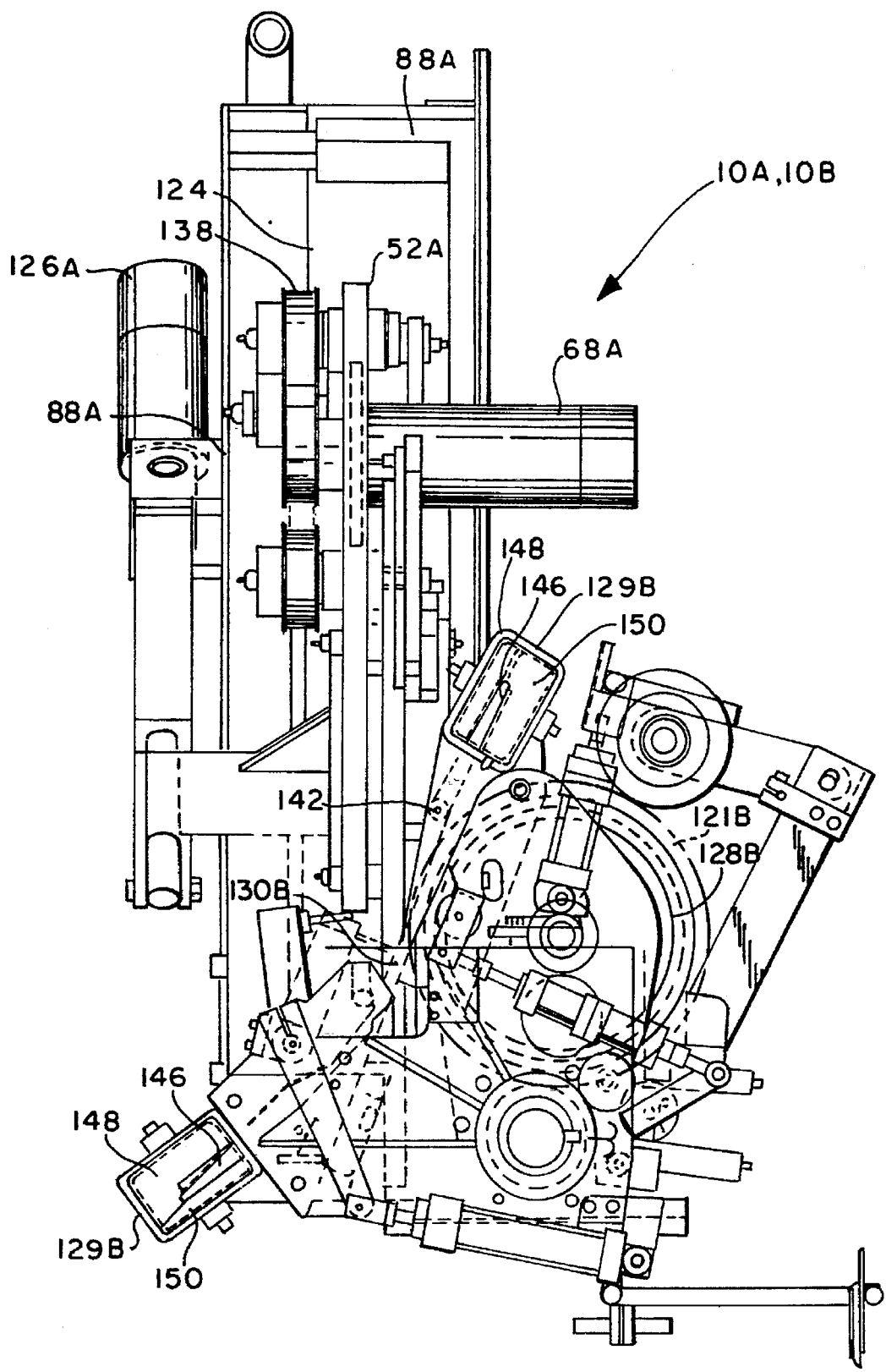
FIG. 9 is an view taken along the line 9—9 in FIG. 8.

With reference to FIGS. 8 and 9, another embodiment of the invention is shown in which twin cutting assembles 10A,10B are mounted on a single base 120 so that two components 121A and 121B of elastomeric material can be cut simultaneously. The twin cutting assemblies 10A,10B have parts similar to the parts previously discussed for the embodiment of FIG. 1 through FIG. 5.

For example, cutting wires 12A and 12B are mounted on reciprocating arms 42A,42B and 48A and 48B which are pivotally mounted on a frames 52A and 52B. The arms 42A and 48A are connected by a center link 54A and the arms 42B and 48B are connected by a center link 54B. A variable speed motor 68A is mounted on the frame 52A which is slidably mounted on linear bearings 124 attached to a ball screw which is driven by a variable speed motor 126A mounted on a stationary support 88A for movement of the frame and cutting wires 12A and 12B up and down into cutting engagement with tire components 121A and 121B at cutting positions 130A and 130B.

The motor 68A which causes the arms 42A,48A and 42B,48B connected by links 54A and 54B to oscillate has a driven pulley 134 connected by a belt 138 to eccentric 60A for one cutting assemblies 10A and an eccentric 60B for the other cutting assembly 10B. These eccentrics 60A and 60B are connected by crank arms 62A and 62B to the arms 48A and 48B so that when the motor 68A is rotated the belt 52A will be driven causing the eccentrics 60A and 60B to be rotated and the cutting wires 12A and 12B to be oscillated.

Figure 7:
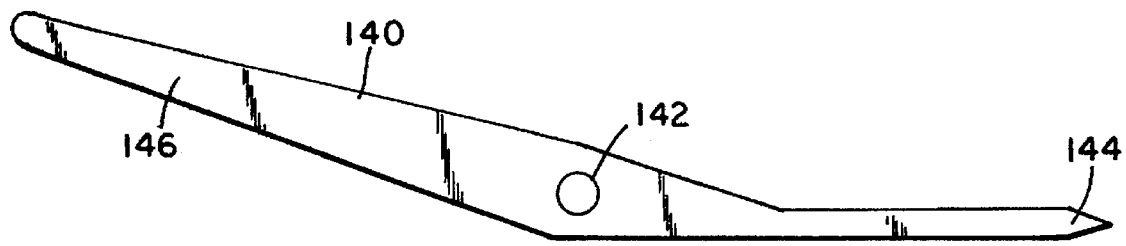
FIG. 7 is a side view of a clamp segment of the clamp shown in FIGS. 8 and 9.

Components 121A and 121B carried over drums 128A and 128B may be clamped by clamping assemblies 129A and 129B adjacent to cutting positions 130A and 130B where the components are cut. The four clamping assemblies 129A and 129B may be used with one on each side of the cutting positions 130A and 130B in side by side positions. Each clamping assembly 129A and 129B has a plurality of segments 140 in side by side positions rotatable about a pivot 142. Each of the segments 140, as shown in FIG. 7, has a clamping end 144 and an actuating end 146. The actuating end 146 is positioned in engagement with inflatable bladders 148 and 150. The elastomeric material of the components 121A and 121B may be clamped in positions 130A and 130B by inflating one of the bladders 148 and 150 which causes each segment 140 to rotate about pivot 142 into contact with the component. As each segment rotates into contact they conform to the cross-sectional shape of components 121A and 121B. The other one of the bladders 148 and 150 may be inflated to move the segments 140 away from the cutting positions 130A and 130B after the components 121A and 121B have been cut.

The apparatus shown in FIGS. 8 and 9 has cutter wire 12A and 12B which are positioned so that they are traversed through the components 121A and 121B with the wires at an acute angle relative to the cutting direction and at an acute angle relative to the supporting surface or drum surface. This results in the cutting pressure being downward as well as forward which maintains the integrity of the feather edges resulting from the angular cut.

In this embodiment, the first cutting wire 12A is designed to oscillate 180° out of phase with the second cutting wire 12B to keep vibration in the combined unit 10B at a minimum.

The present invention has been described with reference to the preferred embodiment. Obviously, modifications and alterations will occur to others upon a reading and understanding of the specification. It is intended by the applicants to include all such modifications and alterations insofar as the come within the scope of the appended claims or the equivalents thereof.

What is claimed is:

1. Apparatus for cutting an elongated body of elastomeric material to length at a predetermined cutting position and an angle comprising:

a cutter assembly including a frame, spaced-apart arms pivotally mounted on said frame, each of said arms having a pivotal mounting, a cutter wire extending between said arms, said cutter wire having a circular cross-section and spaced ends, a pair of collets, each of said collets being pivotally mounted on one of said arms on a pivot pin and in clamping engagement with one of said ends of said cutter wire;

power means connected to said arms for rocking each of said arms about said pivotal mounting of each of said arms, causing said cutter wire to reciprocate and create a slit in said elongated body of elastomeric material; and, means to move said cutter assembly across said elongated body to extend said slit through said elongated body at said predetermined cutting position whereby each of said collets can pivot to eliminate bending stresses on said wire at said collets when said wire is deformed into a bow-shape during cutting of said body;

wherein each of said collets has a thumbnut threaded on a housing member positioned around a collet body member for urging said collet body member into clamping engagement with said wire.

2. Apparatus for cutting an elongated body of elastomeric material to length at a predetermined cutting position and an angle comprising:

a cutter assembly including a frame, spaced-apart arms pivotally mounted on said frame, each of said arms having a first pivotal mounting, a cutter wire having spaced ends extending between said arms, and a pair of collets, each of said collets being pivotally mounted on one of said arms by a pivot pin and in clamping engagement with one of said ends of said cutter wire;

power means connected to said arms for rocking each of said arms about said pivotal mounting of each of said arms causing said cutter wire to reciprocate and create a slit in said elongated body of elastomeric material; and, means to move said cutter assembly across said elongated body to extend said slit through said elongated body at said predetermined cutting position whereby each of said collets can pivot to eliminate bending stresses on said wire at said collets when said wire is deformed into a bow-shape during cutting of said body;

wherein an axis of said cutter wire passes through the center of each of said pivot pins.

3. Apparatus for cutting an elongated body of elastomeric material to length at a predetermined cutting position and an angle comprising:

a cutter assembly including a frame, spaced-apart arms pivotally mounted on said frame, each of said arms having a first pivotal mounting, a cutter wire having spaced ends extending between said arms, and a pair of collets, each of said collets being pivotally mounted on one of said arms on a pivot pin and in clamping engagement with one of said ends of said cutter wire;

power means connected to said arms for rocking each of said arms about said first pivotal mounting of each of said arms causing said cutter wire to reciprocate and create a slit in said elongated body of elastomeric material; and, means to move said cutter assembly across said elongated body to extend said slit through said elongated body at said predetermined cutting position whereby each of said collets can pivot to eliminate bending stresses on said wire at said collets when said wire is deformed into a bow-shape during cutting of said body;

wherein each of said collets has a body member supported in a housing member and a spring pin positioned in engagement with said housing member and said body member to prevent turning of said body member in said housing member and retain said body member in said housing member.

4. Apparatus for cutting an elongated body of elastomeric material to length at a predetermined cutting position and angle comprising:

a cutter assembly including a frame, spaced-apart arms pivotally mounted on said frame, each of said arms having a pivotal mounting, and a cutter wire supported at each end on said spaced-apart arms;

power means connected to said arms for rocking each of said arms about said pivotal mounting causing said cutter wire to reciprocate and create a slit in said elongated body of elastomeric material;

means to provide movement of said cutter assembly across said elongated body to extend said slit through said elongated body at said predetermined cutting position;

a clamping apparatus comprising a plurality of side by side clamping segments mounted on a supporting pivot at a position between first and second ends of said segments, said first ends being positioned to engage said elongated body at a position adjacent said cutting position, and a pair of selectively inflatable bladders, said second ends of said segments extending between said pair of bladders, one of said pair of bladders causing said clamping segments to rotate toward said elongated body when inflated, the other one of said pair of bladders causing said clamping segments to rotate away from said elongated body when inflated, said first ends conforming to the contour of said elongated body and providing clearance for said cutting wire moving through said elongated body.

5. Apparatus for cutting an elongated body of elastomeric material to length at a predetermined cutting position and an angle comprising:

a cutter assembly including a frame, spaced-apart arms pivotally mounted on said frame, each of said arms having a pivotal mounting, a cutter wire extending between said arms, said cutter wire having a circular cross-section and spaced ends, a pair of collets, each of said collets being pivotally mounted on one of said arms on a pivot pin and in clamping engagement with one of said ends of said cutter wire;

power means connected to said arms for rocking each of said arms about said pivotal mounting of each of said arms, causing said cutter wire to reciprocate and create a slit in said elongated body of elastomeric material; and, means to move said cutter assembly across said elongated body to extend said slit through said elongated body at said predetermined cutting position whereby each of said collets can pivot to eliminate bending stresses on said wire at said collets when said wire is deformed into a bow-shape during cutting of said body;

wherein each of said collets has a nut member threaded on a housing member positioned around a collet body member for urging said collet body member into clamping engagement with said wire.

* * * * *